United States Patent Office 3,386,006
Patented May 28, 1968

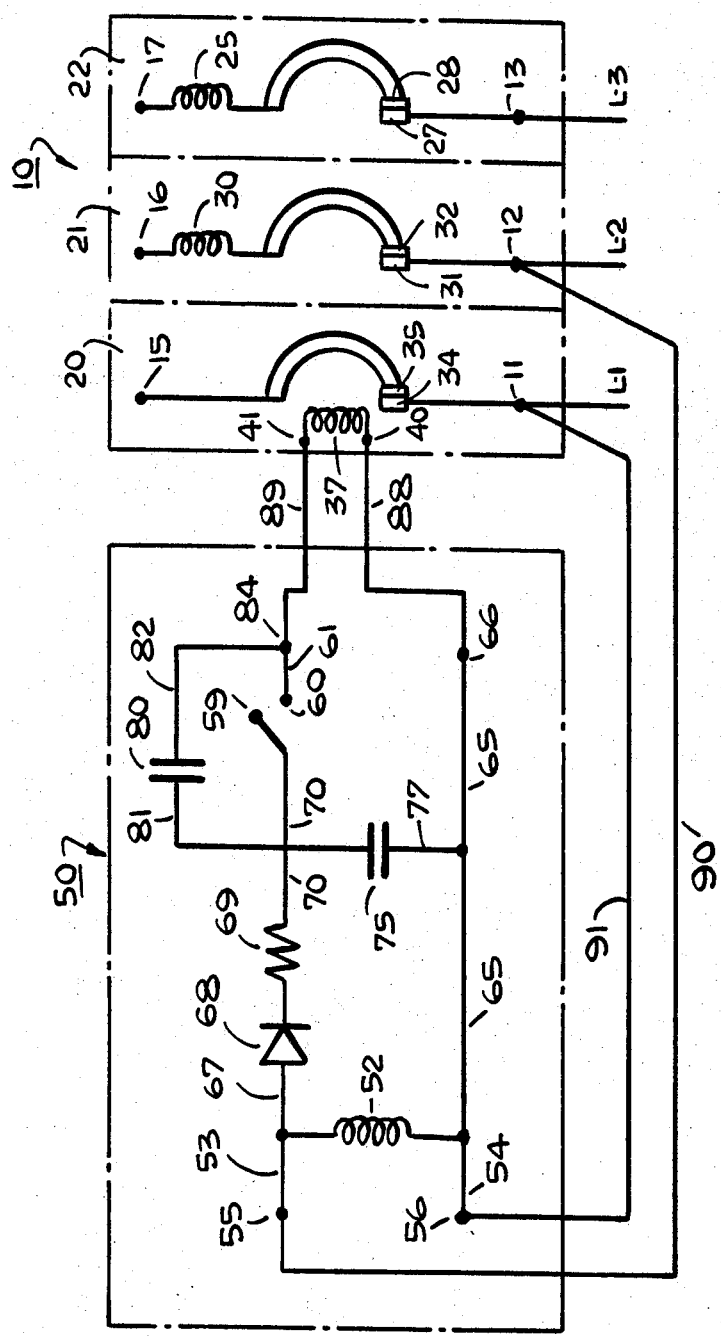

3,386,006
POWER FAILURE CONTROL CIRCUIT SENSITIVE TO POWER RESTORATION FOR A CIRCUIT BREAKER
John N. Runge, Cincinnati, Ohio, assignor to Heinemann Electric Company, Trenton, N.J., a corporation of New Jersey
Filed Sept. 24, 1965, Ser. No. 489,834
6 Claims. (Cl. 317—31)

ABSTRACT OF THE DISCLOSURE

A control circuit is provided for a circuit breaker having a coil which is energized to trip the circuit breaker, the control circuit having a condenser which discharges upon abnormal electrical conditions to energize the coil and trip the circuit breaker. A second condenser is provided in the control circuit, in series with the coil, and the charging of the second condenser also energizes the coil sufficiently to trip the circuit breaker.

---

To protect the transmission line equipment from heavy power demands upon the restoration of power after a power failure, many of the electric utility companies prefer that motors, for instance, be protected by a device which will not automatically place the motor on the line immediately upon the restoration of power or voltage after a power failure or sufficient voltage drop has occurred.

It is, therefore, an object of this invention to provide a power failure control circuit for a circuit breaker, the control circuit being sensitive to power restoration, so that if the circuit breaker is closed during a power failure, the control circuit will automatically cause the circuit breaker to trip open, when, thereafter, the line power is restored.

In this invention, a condenser is provided which is charged during normal current conditions and which discharges upon the power failure, or the predetermined voltage drop, through a coil of a circuit breaker to trip the linkage mechanism of the circuit breaker. A second condenser is provided which charges at a sufficient rate to sufficiently energize the coil of the circuit breaker to trip the linkage mechanism of the circuit breaker whenever the control circuit is energized. Thus, when a power failure, or sufficient voltage drop, occurs, the circuit breaker will open automatically due to the first condenser. If subsequently the circuit breaker is closed while the power failure, or the voltage drop, persists, upon the restoration of power or voltage, the charging of the second condenser energizes the circuit breaker coil sufficiently to trip the linkage of the circuit breaker and open its contacts.

However, if the circuit breaker is closed after the power has been restored, or the voltage returned to normal, the circuit breaker will remain closed, as in this instance the circuit from one of the condensers to the relay coil is open and the current in the circuit of the other condenser, which is now charged, is negligible and below that required in the circuit breaker coil to trip the circuit breaker.

The single drawing diagrammatically illustrates the present invention during normal conditions, i.e. when normal power is in the incoming power lines, and the circuit breakers are closed.

The drawing diagrammatically shows a multipole circuit breaker unit 10 having terminals 11, 12 and 13 connected to suitable three phase alternating current lines L1, L2 and L3 normally energized at a predetermined voltage level. The circuit breaker unit 10 includes terminals 15, 16 and 17 for connecting the circuit breaker unit 10 to suitable loads (not illustrated) and the unit comprises three similar and interconnected circuit breaker poles 20, 21 and 22.

The circuit breaker pole 22 comprises an electromagnetic coil 25 of an electrical tripping device, the coil 25 being connected in series with separable contacts 27 and 28 between the terminals 13 and 17, as diagrammatically illustrated in the drawing.

Likewise, the circuit breaker pole 21 comprises an electromagnetic coil 30 of an electrical tripping device, the coil 30 being connected in series with separable contacts 31 and 32 between the terminals 12 and 16. The coils 25 and 30 being adapted to provide overcurrent or overvoltage protection, as desired, for the loads.

The circuit breaker pole 20 comprises the terminals 11 and 15 connected in series with separable contacts 34 and 35 which are electrically controlled by an electrical tripping device including an electromagnetic coil 37 which is in a separate circuit from that of the terminals 11 and 15 and of the contacts 34 and 35, and which, when sufficiently energized, will substantially instantaneously actuate the tripping device to trip the operating linkage mechanism to open the contacts 34 and 35, if they are closed. The coil 37 is connected to terminals 40 and 41, the latter also forming part of the circuit breaker 20. Circuit breaker poles having the arrangement described for the circuit breaker pole 20 are known as relay trip circuit breaker poles.

Each of the circuit breaker poles 20, 21 and 22 is provided with a linkage mechanism (not illustrated) which may be electrically tripped by an associated electrical tripping device, but all the circuit breaker poles are interconnected by a common means (not illustrated) so that upon the electrical tripping of any one, the others will also be tripped, whereby electrical opening of the contacts in any one of the poles 20, 21 and 22 will cause the contacts of the other poles to open also. Various common trip means are known in the art, and one is illustrated by Sprague Pat. No. 3,098,912, but other arrangements, whereby the tripping of one pole will cause the contacts of the other poles to open also, may be used.

A power failure sensing device 50 is associated with the circuit breaker unit 10 to open the contacts of the unit upon a power failure, or upon the decrease of the line voltage below a predetermined amount, comprising a relay coil 52 connected by suitable wires 53 and 54 to terminals 55 and 56, respectively.

Energization of the coil 52 above a predetermined level maintains the relay contacts 59 and 60 open against a spring bias tending to close the contacts 59 and 60.

A current rectifying diode 68 is connected at one end to the wire 53 by a wire 67 and on the other end to the resistor 69 which in turn is connected to the contact 59 by a wire 70, the resistor 69 limiting peak voltages which might otherwise tend to damage the diode 68.

A condenser 75 is connected by a wire 76 to the wire 70 between the resistor 69 and the contact 59 and the condenser 75 is connected at the other end by a wire 77 to a further wire 65 which extends between the wire 54 and a terminal 66.

A second condenser 80 is connected on one end by a wire 81 to the wire 70, between the resistor 69 and the contact 59, and on the other end to a terminal 84 by a wire 82.

The power failure sensing device 50 is connected to the circuit breaker coil 37 by wires 88 and 89 which extend, respectively, between the terminals 66 and 84, on the one hand, and the terminals 41 and 40, on the other hand. Similarly, the power failure sensing device 50 is connected to the lines L1 and L2 by wires 90 and 91 which extend, respectively, between terminals 55 and 56, on the one hand, and terminals 11 and 12 on the other hand.

When the power failure sensing device 50 and the circuit breaker unit 10 are first installed, assuming that this is done at a time when normal power is in the lines L1 and L2, if the circuit breaker pole 20 is in the closed position, the power failure sensing device will cause the pole 20 to trip, tripping the other circuit breaker poles also due to their interconnection, because both the condensers 75 and 80 will charge and the charging current drawn by condenser 80 through coil 37 is sufficient to actuate the tripping device of circuit breaker pole 20. At such time, the electrical tripping device of pole 20 will be moved to the tripping position and will remain in this position only for the short period of time required to charge the condenser 80. After the short time period of time required to charge the condenser 80, the current flow in the circuit breaker coil 37 substantially terminates and the tripping device of the pole 20 moves to its initial position, that is, the position prior to being moved to the tripping position. The condenser 75 charges through the circuit comprising wire 90, terminal 55, wires 53 and 67, diode 68, resistor 69, wires 70 and 76, wires 77, 65 and 54, terminal 56, and wire 91, but condenser 75 has no effect on the operation at this time because the coil 52 is energized sufficiently to maintain the contacts 59 and 60 open. The condenser 80 charges through the circuit comprising wire 90, terminal 55, wires 53 and 67, diode 68, resistor 69, wires 70 and 81, wire 82, terminal 84, wire 89, terminal 41, circuit breaker coil 37, terminal 40, wire 88, terminal 66, wires 65 and 54, terminal 56, and wire 91. After this tripping of the pole 20, the contacts of the pole 20 may be reclosed, thereby reclosing the contacts of the other poles, assuming that all three poles have a common handle or the handles are interconnected for joint movement, and since the condenser 80 remains charged and no current is now drawn through the circuit breaker coil 37.

If the power failure sensing device 50 and the multipole circuit breaker unit 10 are first installed when the circuit breakers are in the contacts open position, the condenser 80 will charge, energizing the circuit breaker coil 37, which will move the electrical tripping device of the pole 20 to the tripping position momentarily, but the tripping device will return to its initial position, snce the current through the coil 37 quickly drops to a value below that which will actuate the tripping device, permitting closing of the contacts 34 and 35 of the pole 20 and, hence, closing of all the circuit breaker contacts.

Assuming the power failure sensing device 50 and the circuit breaker unit 10 to be connected as shown in the drawing and normal power to be in the lines L1 and L2, if there is a power failure in the lines L1 and L2, or if the voltage in the lines L1 and L2 drops below a predetermined amount, the relay coil 52 becomes sufficiently deenergized to cause the contacts 59 and 60 which it controls to close, since these contacts are spring biased to the contacts closed position. The closing of the contacts 59 and 60 provides a discharge path for the charge of condenser 75 through wires 76 and 70, contacts 59 and 60, wire 61, terminal 84, wire 89, terminal 41, circuit breaker coil 37, terminal 40, wire 88, terminal 66, and wires 65 and 77, while simultaneously discharging the condenser 80 through wire 82, terminal 84, wire 61, contacts 59 and 60, and wires 70 and 81. The discharge of the condenser 75 at this time is sufficient to energize the circuit breaker coil 37 sufficiently to trip the mechanism of the pole 20, whereupon, due to the interconnection of the poles, all of the contacts of the poles 20, 21 and 22 open virtually simultaneously. Note that at this time, the condenser 80 has no effect on the circuit breaker coil 37.

If during a power failure, the poles 20, 21 and 22 are reclosed, upon a subsequent restoration of power, the power failure sensing device 50 will automatically trip the pole 20 to open all the circuit breaker contacts upon such power restoration. This is so because upon restoration of power in the lines L1 and L2, the condenser 80 charges to the rectified voltage through the circuit comprising wire 90, terminal 55, wires 53 and 67, diode 68, resistor 69, wires 70 and 81, wire 82, terminal 84, wire 89, terminal 41, circuit breaker coil 37, terminal 40, wire 88, terminal 66, wires 65 and 54, terminal 56 and wire 91. This charging current is sufficient to energize the coil 37 to trip the pole 20, the electrical tripping device of the pole 20 being related to the condenser 80 so that the coil will become energized sufficiently to trip the pole 20 before the condenser 80 fully reaches the rectified voltage and at this time the voltage across the circuit breaker coil 37 has dropped to a low value, since substantially no current is passing through the condenser 80 at such time. Further, at this time, the condenser 75 charges to the level of the rectified voltage, but its charging current has no effect on the coil 37, i.e., only the condenser 80 is effective at this time.

In summary, assuming that the conductors 90 and 91 are connected to the terminals 11 and 12 as shown in the diagram, that is, the control circuit is connected to the incoming power lines, and further assuming that there is normal power in the lines L1, L2 and L3, the power failure sensing circuit 50 is energized, the contacts 59 and 60 are open, and the condensers 75 and 80 are charged. Subsequently, when there is a power failure in the lines L1 and L2, the relay coil 52 is deenergized, allowing the contacts 59 and 60 to close under pressure of their spring bias, whereby the condenser 75 discharges across the circuit breaker coil 37, tripping the pole 20 to open all the circuit breaker contacts and simultaneously discharge the condenser 80.

Subsequent to the power failure, if the poles 20, 21 and 22 are closed while there is a power failure existing, when the power is restored, the power will energize the relay coil 52 opening the contacts 59 and 60, but the condenser 80, which discharged at the time of the power failure, now charges and this charging current energizes the circuit breaker coil 37 sufficiently to trip the operating mechanism of the pole 20. When the pole 20 trips, all the circuit breaker contacts open but this has no effect on the electrical power failure sensing device 50, since the conductors 90 and 91 are connected to the line ends of the circuit breaker poles. Therefore, the relay coil 52 will remain energized and the contacts 59 and 60 will remain open, preventing the discharge of the condenser 80. This is beneficial, since the condenser 80, being now fully charged will draw substantially no current through the coil 37 upon reclosing of the circuit breaker poles, and, hence, the pole 20 will remain closed at this time.

Having described the invention, I claim:

1. A control circuit for a circuit breaker having an electrical tripping device comprising a condenser dischargeable in response to abnormal conditions in said circuit to cause energization of said electrical tripping device by discharging through the electrical tripping device to trip the circuit breaker, a second condenser in said control circuit, in series with said electrical tripping device, and the charging of which energizes said electrical tripping device sufficiently to trip the circuit breaker, and contacts disconnecting said first condenser from said tripping device when said second condenser is charging.

2. A control circuit for controlling a circuit which includes a circuit breaker having an electrical tripping device operable when energized to trip the circuit breaker, said control circuit energizing said electrical tripping device on predetermined conditions in the circuit controlled by the circuit breaker, a condenser in said control circuit, and contacts responsive to predetermined conditions in the control circuit to connect said condenser from said control circuit to said electrical tripping device to energize the latter, and a second condenser serially connected to said electrical tripping device and charged whenever said control circuit is energized to energize said electrical tripping device when said second condenser is charged.

3. In combination, a circuit breaker having an operating linkage mechanism and an electrical tripping device for tripping said operating linkage mechanism, a control circuit for energizing said electrical tripping device comprising an electrical storage device, said circuit breaker and control circuit being energized from the same source, said control circuit including a relay coil and separable contacts engageable to connect said electrical tripping device to said storage device, said relay coil normally maintaining said contacts open, said contacts being biased toward the contacts closed position, whereupon a predetermined drop in voltage across said relay coil, said contacts close and connect said electrical tripping device to said electrical energy storage device, and a second electrical energy storage device connected across said contacts, in series with said electrical tripping device, and in parallel with said relay coil.

4. In combination, a circuit breaker having an operating linkage mechanism and an electrical tripping device for tripping said operating linkage mechanism, a control circuit for energizing said electrical tripping device, said control circuit including a relay coil energized from the same source as said circuit breaker, a condenser in parallel with said relay coil, separable contacts controlled by said relay coil and engageable to connect said electrical tripping device to said condenser, said relay coil normally maintaining said contacts open but said contacts being biased to the contacts closed position, whereupon a predetermined drop in voltage across said relay coil, said contacts close to connect said electrical tripping device to said condenser, and a second condenser connected in parallel with said contacts, in series wth said electrical tripping device, and both said second condenser and said electrical tripping device being connected to a source of electrical potential.

5. A control circuit for a multipole circuit breaker unit, said multipole circuit breaker unit comprising at least two interconnected circuit breaker poles so connected that tripping of one will cause the other to trip open also, each pole having an electrical tripping device and separable circuit breaker contacts, one of said poles having its electrical tripping device electrically separate from its contacts and associated with said control circuit, said control ciruit comprising a relay coil, a circuit rectifier connected in parallel with said relay coil, a condenser connected to said current rectifier and in series with said electrical tripping device, separable relay contacts biased toward the closed position but maintained open by said relay coil when the latter is sufficiently energized, said relay contacts being in the circuit between said condenser and said electrical tripping device, and a second condenser connected to said current rectifier, in series with said electrical tripping device and across said relay contacts, said control circuit and said circuit breaker poles being energized from the same source.

6. In combination, a control circuit, a multipole circuit breaker unit having load and line terminals, said multipole circuit unit comprising at least two circuit breaker poles interconnected so that tripping of one will cause the other to trip open also, each pole having an electrical tripping device and separable circuit breaker contacts, one of said poles having its electrical tripping device electrically separate from its contacts and associated with said control circuit, said control circuit comprising a relay coil, rectifier and condenser circuit connected to the line terminals of said multipole circuit breaker unit, relay contacts held open by the relay coil when the latter is energized and connecting the electrical tripping device which is electrically separate from its circuit breaker contacts in shunt with said condenser, and a second condenser connected across said relay contacts and in series with said rectifier and the electrical tripping device which is electrically separate from its circuit breaker contacts.

References Cited
UNITED STATES PATENTS

| | | | |
|---|---|---|---|
| 3,127,542 | 3/1964 | Riebs | 317—36 X |
| 3,307,075 | 2/1967 | Park | 317—151 X |

MILTON O. HIRSHFIELD, *Primary Examiner.*

J. D. TRAMMELL, *Assistant Examiner.*